United States Patent [19]
Nichol et al.

[11] 3,920,050
[45] Nov. 18, 1975

[54] SHROUD FOR COILED HOSES

[76] Inventors: George D. Nichol, 411 Washington St., Pittsfield, Ill. 62363; John C. Schmidt, 2307 Castilla Isle, Fort Lauderdale, Fla. 33301

[22] Filed: Apr. 1, 1974

[21] Appl. No.: 456,966

[52] U.S. Cl. ............................. 138/110; 138/134
[51] Int. Cl.² ..................................... F16L 57/00
[58] Field of Search ............. 138/129, 110, 134, 96

[56] References Cited
UNITED STATES PATENTS

| 644,039 | 2/1900 | Benton | 138/134 X |
| 2,474,690 | 6/1949 | Robinson et al. | 138/134 X |
| 2,583,900 | 1/1952 | Spence | 138/134 X |

Primary Examiner—John Petrakes
Assistant Examiner—James E. Bryant, III
Attorney, Agent, or Firm—John A. Hamilton

[57] ABSTRACT

A protective shroud for coiled hoses for preventing fouling or entangling of closely adjacent hoses, or catching of a user's clothing between the convolutions of a single hose, consisting of a pair of concentric helical coils of fine spring wire enclosing the convoluted portion of the hose, the coils being wound respectively in opposite directions, and end fittings connecting the opposite ends of said coils to said hose adjacent the convoluted portion thereof, the coils and end fittings being applicable to the hose without removal of any couplings to which the hose may be connected.

4 Claims, 4 Drawing Figures

U.S. Patent  Nov. 18, 1975  3,920,050
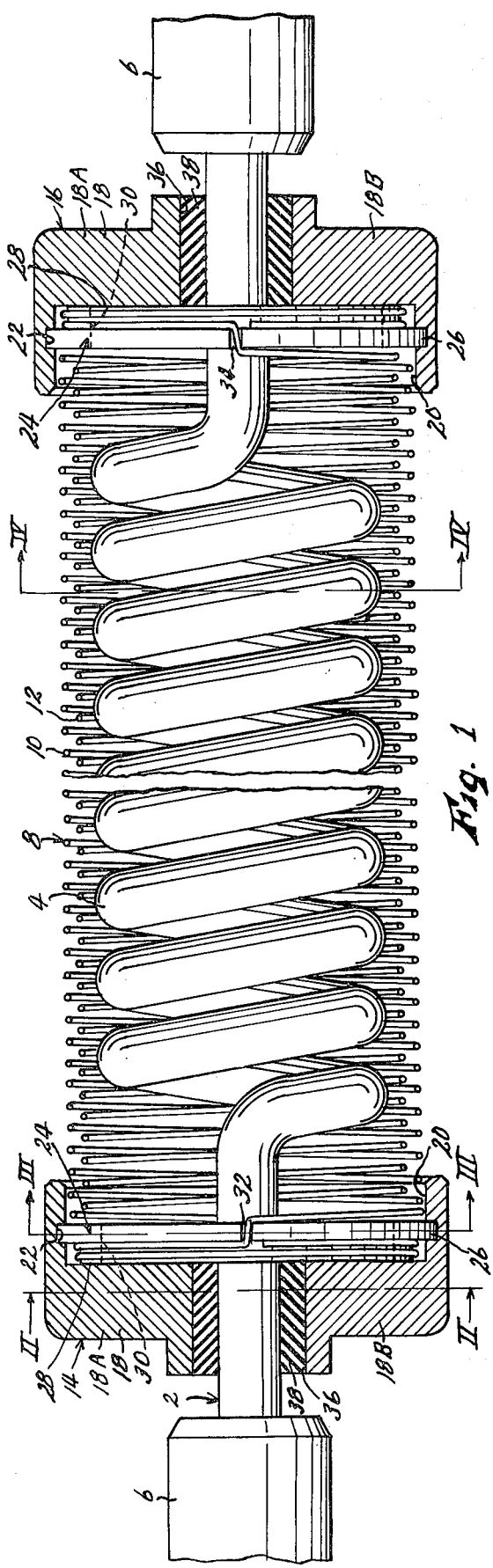
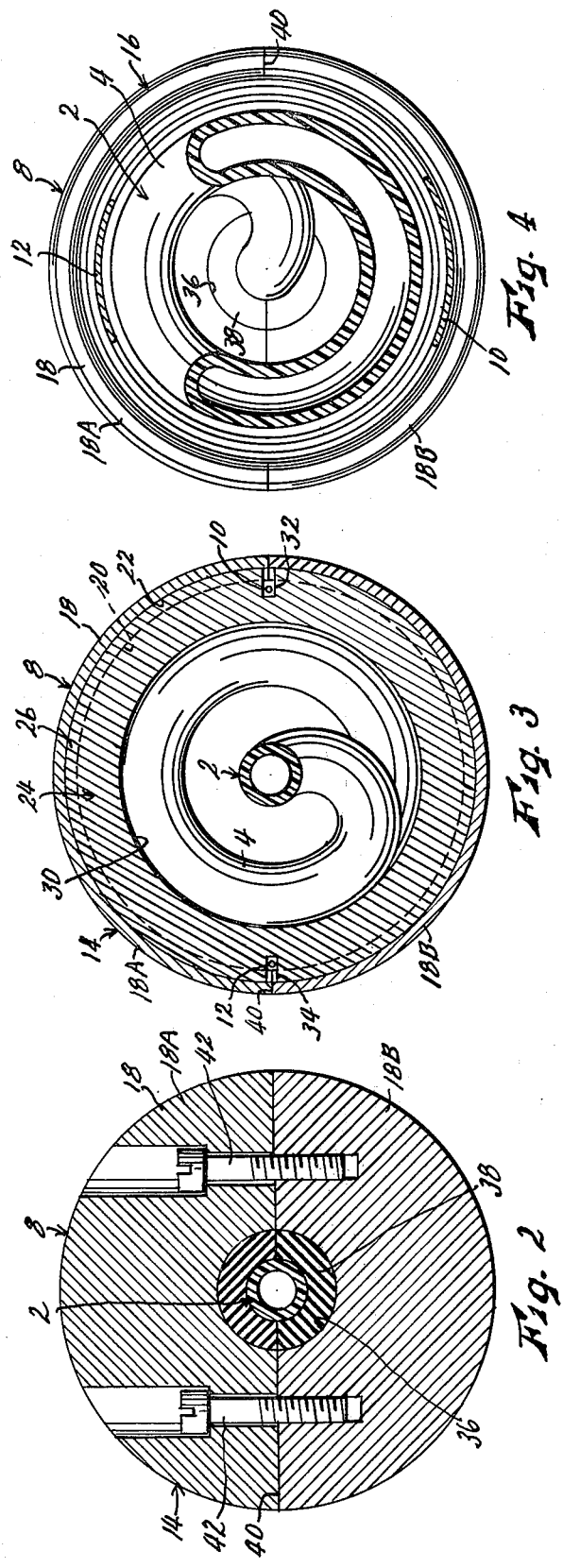

SHROUD FOR COILED HOSES

This invention relates to new and useful improvements in protective shrouds or sheaths for coiled hoses. Small hoses, and also electrical wires, lengths of which must be freely flexible and which must be freely extendable to greater or lesser distances from a point of attachment, are commonly formed in resilient helical form so as to be neatly coiled when retracted, but to be freely extendable to greater distances when tension is exerted thereon. They perform this function adequately, but are subject to certain resultant problems. For example, the coiled configuration thereof sometimes results in catching and pinching of the user's sleeves or other portions of his clothing between the convolutions thereof. Also, when several hoses are disposed in close juxtaposition, their convolutions sometimes result in their becoming entangled with each other. Both of these problems are often evident in the case of a dentist's office, wherein many dental instruments are powered by or utilize compressed air, water, lubricants or other fluids, which fluids are supplied to the instruments by small flexible hoses extending from an instrument console. The usual console may carry several such instruments, and the fluid supply hoses are usually connected to the console in close juxtaposition to each other. It is for this dental office application that the present hose shroud has been primarily designed, but it will be readily apparent that it may be used in many other environments.

Accordingly, the principal object of the present invention is the provision of a shroud for a coiled hose which largely obviates the above described problems, providing a protective sheath for the helically convoluted portion of the hose which in very large measure will prevent catching of the user's clothing therein, and will prevent tangling of closely adjacent hoses. Generally, this object is accomplished by the provision of a shroud consisting of a helically wound spring wire enclosing the helical portion of the hose, the wire being of very small diameter as compared to that of the hose, the wire coil being wound oppositely to the twist of the hose coil, and having many more turns per inch than the hose coil. The multiple turns of the wire coil cause it to present a more continuous external surface, with smaller openings to inhibit the entry of the user's clothing, or of adjacent hoses, while the opposite twist prevents entanglement between the wire coil and the hose coil.

Another object is the provision of a hose shroud of the character described including two concentric wire coils surrounding the hose, the two wire coils being wound in respectively opposite directions. This provides a still more nearly continuous external surface for the shroud, and also permits the shroud to be used on a hose with either a left hand or a right hand twist, since in either case one of the wire coils will have a twist opposite to that of the hose.

Virtually all hoses of the type here involved are provided with end couplings for attaching its ends, for example, respectively to a fluid source and to a dental instrument. A further object of the present invention is the provision of a hose shroud of the character described which may be applied over and operatively affixed to the hose without requiring disassembly of said hose from its end couplings.

Other objects are simplicity and economy of construction, efficiency and dependability of operation, and adaptability for use in a wide variety of applications.

With these objects in view, as well as other objects which will appear in the course of the specification, reference will be had to the accompanying drawing, wherein:

FIG. 1 is a longitudinal sectional view, partially broken away and foreshortened, and with parts left in elevation, of a hose shroud embodying the present invention, shown operatively applied to a coiled hose, FIG. 2 is a sectional view taken on line II—II of FIG. 1, FIG. 3 is a sectional view taken on line III—III of FIG. 1, and FIG. 4 is a sectional view taken on line IV—IV of FIG. 1.

Like reference numerals apply to similar parts throughout the several views, and the numeral 2 applies generally to a hose having a portion thereof formed in a helical coil 4. Said hose is flexible and is sufficiently resilient to constitute coil 4 as a resilient spring, whereby the hose may be extended yieldably to greater effective lengths. The coil 4 may occupy any desired portion of the total length of the hose, and the hose may be of any desired length. The resilience may be provided by forming the hose of a plastic or other suitable material having the required degree of resilience, as shown, or by molding therein a spring wire coil of the desired shape, or by enclosing the hose coil in a spring wire frame of the desired shape. Also, while the hose as shown has a single fluid passage therein, it will be understood that in the case of dental instruments, each hose may have two or three or perhaps even more flow passages, in which case the hose may consist essentially of several initially separate hoses bonded together. In most cases, the hose is provided at each end with a coupling 6, one for coupling to a fluid source or sources, and one for coupling to a dental instrument or the like.

The shroud forming the subject matter of the present invention is indicated generally by the numeral 8, and includes a pair of helical wire coils 10 and 12 and a pair of end fittings designated generally and respectively at 14 and 16. Wire coils 10 and 12 are concentric with each other and with hose coil 4, and are of normally greater length than the hose coil, extending outwardly from each end of the hose coil to enclose parts of the non-convoluted end portions of the hose. The wire coils are formed of spring wire of a diameter much less than that of the hose, and have a relatively much greater number of turns per inch than said hose. In fact, while the adjacent convolutions of the wire coils are shown spaced apart, for clarity, it will be understood that when the hose coil is relaxed and hence retracted as shown, the wire coils may actually be closed, that is, with adjacent convolutions in engagement. The closer these wire convolutions are formed, the more continuous the effective outer surface of the shroud will be even when the hose is extended, and the more effective said shroud will be in preventing the user's clothing, or adjacent hoses, from entering therein. The finer the wires of which coils 10 and 12 are formed, the less they will stiffen the hose and increase its resistance to extension. As shown, hose coil 4 and outer wire coil 10 are provided with a right hand twist, while inner wire coil 12 is provided with a left hand twist.

End fittings 14 and 16 serve to secure the ends of wire coils 10 and 12 firmly to hose 2 adjacent the respective ends of the coiled portion 4 thereof, and it is of course obviously desirable to be able to apply the shroud without necessity of removing end couplings 6 from the hose, since the connection of the hose to the couplings is often of a permanent nature making disassembly difficult or impossible. To this end, each of the end fittings includes a rigid body member 18 concentric with the hose, and having a socket 20 formed in the end thereof confronting the hose coil, said socket being of a diameter to receive the ends of wire coils 10 and 12 therein. A peripheral groove 22 is formed in the internal surface of said socket. A retainer ring 24, also concentric with the hose, is provided with an external flange 26 engageable in groove 22, and a barrel portion 28 at the side of said flange opposite from the hose coil, said barrel having an external diameter less than that of socket 20, and adapted to abut the base of said socket, as shown. The internal diameter 30 of the retainer ring is sufficiently large to pass freely over both end fittings 6, and also over hose coil 4. Flange 26 has a pair of radial notches 32 and 34 formed therein respectively at diametrically opposite points. The adjacent end portion of wire coil 10 is bent to extend through notch 32, and is then coiled around barrel 28, while the wire of coil 12 is angled through notch 34 and coiled around barrel 28, all as best shown in FIG. 1. The wires are prevented from slipping off of barrel 28 by the enclosure of said barrel in socket 20, and by the abutment of said barrel with the base of said socket. The portion of each body member 18 outward from its socket 20 is reduced in internal diameter to engage closely about hose 2, having a central aperture 36 provided with a thick liner 38 of soft rubber or the like for providing a good frictional grip on the hose. The entire body member 18, including liner 38 but not retainer ring 24, is diametrically split into two halves 18A and 18B, as indicated by division line 40 in FIGS. 2–4, and the two halves are secured releasably together by a pair of screws 42 (see FIG. 2) extending transversely to the hose at respectively opposite sides thereof.

The shroud may thus be applied by passing wire coils 10 and 12, assembled to retainer rings 24 but without body members 18, longitudinally over end couplings 6 and coil 4 of the hose itself, to the desired position, then applying the halves 18A and 18B of each body member to engage groove 22 over flange 26 of the associated retainer ring, and finally inserting and tightening screws 42 to clamp the end fittings on the hose. Liners 38 are sufficiently thick and soft to provide a good grip on hoses of different sizes and cross-sectional contours.

In operation, it will be seen that wire coils 10 and 12 conjointly form a shroud or sheath surrounding the hose coil. This shroud is of course only in skeleton form, due to the spaced apart relation of the wire convolutions at least when the hose coil and the wire coils are extended to greater lengths. However, if the wire coils are of sufficiently fine wire, and are closely enough wound, the resultant shroud will have a sufficiently continuous exterior surface to prevent effectively the entry of the user's closthing, or of adjacent hoses, therethrough, so as to prevent fouling or entanglement. Also, the use of fine wire renders the wire coils very freely extendable, so that they do not increase the resistance of the hose to extension to any objectionable degree. The use of two wire coils wound in respectively opposite directions further improves the continuity of the external shroud surface, in that overlapping wires of the two coils, at any point in the shroud "surface", intersect at an angle, rather than being generally parallel as would be the case if the coils were wound in the same direction. The counter-winding of the two wire coils also prevents possible entangling of the wires thereof.

A single wire coil, rather than two as shown, would provide at least some of the advantages described. However, it obviously would not provide the same degree of continuity of the shroud "surface", and furthermore would necessitate that the wire coil be wound oppositely to the hose coil, in order to prevent possible entanglement therebetween. At the same time, it is also true that hoses of the type shown are commonly supplied with both left and right hand twists. Therefore, when furnishing shrouds of the type shown except that they included only a single wire coil, it would be necessary to supply shrouds with a left hand twist for use on hoses with a right hand twist, and vice versa. By using two wire coils with relatively opposite twists, the shroud is adapted for use with hoses having either left or right hand twists, the wire coil twisted oppositely to the hose preventing entanglement of either wire coil with the hose coil, and the relatively opposite twists of the two wire coils preventing entanglement between the wires. Accordingly, the use of two wire coils having respectively opposite directions of twist, as shown, is preferred.

While we have shown and described a specific embodiments of our invention, it will be readily apparent that many minor changes of structure and operation could be made without departing from the spirit of the invention.

What we claim as new and desire to protect by Letters Patent is:

1. A shroud for a flexible, resilient hose having a portion thereof formed in a helical coil whereby to be resiliently extendable and retractable in effective length, said shroud comprising:

a. a helical coil of resilient wire adapted to be disposed generally concentrically with said hose in surrounding relation to the coiled portion of said hose, said wire coil being formed of wire having a much smaller diameter than said hose, and being wound with a great many more turns per inch than the coiled portion of said hose, whereby to constitute in skeleton form a sheath having a surface as continuous as reasonably possible, and b. attaching means joined to each end of said wire coil and adapted to be clamped to said hose adjacent the coiled portion of said hose, said attaching means at each end of said wire coil comprising a retainer ring connected to said wire coil concentrically therewith and having an internal diameter sufficiently large to be passed longitudinally over the coiled portion of said hose, and a body member engaged with said retainer ring and including means operable to engage clampingly about said hose adjacent the coiled portion thereof.

2. A shroud as recited in claim 1 wherein said retainer ring has an outer peripheral edge portion, and wherein said body member is diametrically split and is provided with an internal peripheral groove for receiving said peripheral edge portion of said retainer ring, whereby to be applicable laterally of said hose, and with the addition of fastening means for securing the portions of said body member together in assembled relation surrounding said hose and said retainer ring.

3. A shroud as recited in claim 2 wherein said fastening means is operable to draw the portions of said body member forcibly together laterally of said hose, and wherein said body member is provided with a central aperture, also intersected by said split, through which a non-coiled portion of said hose extends, said aperture being lined with a soft, resilient material, also intersected by said split, adapted to be drawn into firm frictional engagement with said hose as the portions of said body member are drawn together by said fastening means.

4. A shroud as recited in claim 1 for use in connection with a hose provided at its ends with couplings affixed thereto, the internal diameters of said retainer rings also being sufficiently large to pass over said couplings.

* * * * *